United States Patent [19]

Schöpf et al.

[11] 4,356,741
[45] Nov. 2, 1982

[54] CAST CRANKSHAFTS

[75] Inventors: Hans-Joachim Schöpf, Stuttgart; Dietmar Lug, Weissach i. T., all of Fed. Rep. of Germany

[73] Assignee: Daimler-Benz Aktiengesellschaft, Stuttgart, Fed. Rep. of Germany

[21] Appl. No.: 118,975

[22] Filed: Feb. 6, 1980

Related U.S. Application Data

[63] Continuation of Ser. No. 876,320, Feb. 9, 1978, abandoned.

[30] Foreign Application Priority Data

Feb. 12, 1977 [DE] Fed. Rep. of Germany ....... 2706072

[51] Int. Cl.³ ............................................... F16C 3/04
[52] U.S. Cl. ....................................... 74/595; 74/596; 29/6
[58] Field of Search ................ 74/595, 596, 603; 29/6

[56] References Cited

U.S. PATENT DOCUMENTS 2,419,274  4/1947  McDowall et al. .................. 74/603
3,673,651  7/1972  Stewart ................................ 74/603
4,015,485  4/1977  Ganter-Ullmann et al. ......... 74/596

Primary Examiner—Kenneth Dorner
Attorney, Agent, or Firm—Paul M. Craig, Jr.

[57] ABSTRACT

A cast crankshaft with recesses or apertures provided in crank webs of the crankshaft and are formed in adjoining inner area of the casting material forming the main and crank pins by cores inserted therein prior to casting for the reduction of the weight and of the rotating out-of-round masses as well as of the counterweights thereof. A ratio of the smallest distance of the fillet of the crank pin from the outer surface line of the recess to the diameter of the crank pin lies between the values of 0.45 and 0.66, preferably at a ratio of about 1:2 with such distance being approximately as large as the distance between adjacent fillets at the crank and main pins from one another.

14 Claims, 5 Drawing Figures

CAST CRANKSHAFTS

This is a continuation of application Ser. No. 876,320, filed Feb. 9, 1978, abandoned.

The present invention relates to a cast crankshaft with recesses or apertures which extend through the crank webs of the crankshaft and which result in the adjoining inner area of the casting material forming the main and crank pins from cores inserted thereat prior to the casting operation for the reduction of the weight and of the rotating out-of-round masses as well as of the counter weights thereof.

The expenditure which has to be made in the preparation for casting crankshafts and the expenditure for the casting itself are justified only if the finished product, namely, the cast shaft offers significant advantages as compared to the forged shaft. However, cast crankshafts can be designated as optimal only if all technical possibilities which the casting techniques entail compared to the forging techniques are fully utilized. One of the advantages of casting techniques resides in the fact that the rotating out-of-round masses and corresponding counterweights are reduced as much as possible. This takes place in a known manner by the provision of recesses or apertures in the main and crank pins. These recesses or apertures now have to be constructed and shaped specially in order that the end product, namely, the crankshaft, has the lowest weight which is possible, whereby attention must be paid in particular that stress peaks in the fillets of the main and crank pins initially achieve a minimum value.

Taking the above factors into consideration, it is the aim of the present invention to provide a construction of the crankshaft which is satisfactory from a casting point of view, in which an endurance limit, especially of the fillet radii, which have to be adapted to be rolled, and reaches a particularly high value with particular attention being given to the core techniques and the tolerances of the recesses or apertures.

At all loads which occur at a crankshaft such as, for example, bending as a result of ignition and mass force, bending as a result of a constant torque and twisting as a result of a torsional moment, the main-pin-fillets and the crank-pin-fillets are stressed the most. The recesses or apertures of the crank pins and of the main pins determinatively influence the stress level at the crank pin fillet. Accordingly, it is also a task of the present invention to so construct the apertures or recesses that the occurring stresses are not higher—and, if possible, than with a crankshaft without recesses or apertures.

The underlying problems are solved according to the present invention in that the ratio of the smallest distance of the fillet of the crank pin from the outer surface line of the recess or aperture to the diameter of the crank pin lies between the values of 0.45 and 0.66 and, especially at a ratio 1:2, and that this distance is approximately as large as the distance of adjoining fillets at the main and crank pins from one another.

Photoelectric tests have indicated that with such a ratio, optimal conditions for the stress level of the crankshaft actually result. It is thereby immaterial how the apertures or recesses are constructed as to the rest. For the most part, one will construct the recesses or apertures in such a manner that a web remains in the center between the same. However, it is also possible to construct the aperture so as to uninterruptedly pass through the crankshaft, if care is taken that a burr web does not remain in the center. It has no influence on the formation of the dangerous stresses whether a passing-through aperture is provided in a crank pin or whether an aperture or recess of lesser depth is provided from each side which includes therebetween a center web. The strength and rigidity of the crankshaft is the same in both cases; namely it will be increased in every case by the recesses or apertures.

It is also of significance if the main pin aperture or recess is particularly large in a direction toward the crank pin and preferably extends approximately up to the beginning of a transition of the thrust collar at the crank web or even if the aperture or recess slightly exceeds this limit. The main pin recess or aperture extension thereby effects a great relief of the crank pin fillet, especially when the top edge thereof is identical with the transition of the thrust collar into the crank web or even if it slightly intersects the same.

A very flat stress variation in the circumferential direction of the fillets is achieved by very wide recesses or apertures. This flat stress course is unfavorable for rigidity because the stress gradient becomes very small in the circumferential direction and therewith the macro-support effect in the material is not called upon. Consequently, according to a further feature of the present invention, the ratio of the width of the recesses or apertures to the width of the crank webs of the crankshaft is to be at most 2:3. As a result thereof, the ratio of the weight to stress variation becomes very favorable.

During the manufacture of cast crankshafts according to the shell-molding process, one has to reckon with a core displacement. Consequently, the tolerance specification is of particular significance. Accordingly, one proceeds so that the tolerance specification with respect to the mentioned boundary line of the inner wall surface of the recess or aperture within the area of the crank pin and with respect to the point of the main pin extension which is farthest removed from the longitudinal center axis are directed only toward the outside, i.e., away from the center longitudinal axis. As a result thereof, the respectively most favorable effect as regards the rigidity can be achieved in the case of a displacement of the core.

With a heretofore customary arrangement of the core by means of which the recesses or apertures result during the casting and which cores are not much larger than the apertures or recesses themselves, an edge with a different, frequently jagged burr formation about the recess or aperture cannot be avoided during the casting operation. These burrs have to be removed with great care and disproportionately great expenditure especially in the neighborhood of the symmetry axis through a crank web or cheek. However, damages of the casting skin in the form of notch effects thereby occur readily and especially in a mechanically highly stressed zone. The consequences thereof are rejects and, under certain circumstances, even shaft breakage due to crack formation. In order to avoid these consequences, it is proposed according to the present invention to utilize a common core for two oppositely disposed recesses or apertures provided in adjoining crank pins of such a configuration that the boundary surfaces thereof overlap the associated crank webs of the crankshaft up to a point beyond the web center and, in the direction toward a longitudinal center axis, extend approximately up to the center of the main pin. In this manner, any burrs formed would lie along the narrow side of the crank web where a cleaning of the casting can be carried out without danger because no special stresses occur thereat. Additionally, the burr extends over the main pin, i.e., at a place which is machined anyhow.

If oil bores are to be provided which have to extend in proximity of the recesses or apertures or which even have to extend through the same, then this does not have to be considered as a disadvantage; in contrast, such a requirement may even entail advantageous benefits if rib-like reinforcements are provided in the recesses or apertures as material for oil bores provided within the area of the recesses or apertures, which rib-like reinforcements are matched to the course of the provided oil bores and follow the same. In order to avoid the formation of shrinkages or cavities, especially of micro-cavities during the casting, care must be taken that the flow of the material during the casting can take place in an unimpaired manner. For that purpose, attention has to be paid, according to a further feature of the present invention, to such a construction and arrangement of the recesses or apertures within the area of the main and crank pins that a flow channel of as uniform a flow cross section as possible is assured for the material to be cast coming from the main pin between the recesses or apertures in the crank webs and within the area of the crank pin. Consequently, care must be taken for a through-flow or passage of approximately equal width at all places. Attention must be paid thereby that the smallest distance of the fillet of the crank pin from the outer surface line of the recess or aperture of the crank pin and the distance between the start of the crank pin at a crank web and the adjoining thrust collar of the main pin at the same crank web are approximately equally large.

Accordingly, it is an object of the present invention to provide a cast crankshaft which avoids by simple means the aforementioned shortcomings and drawbacks encountered in the prior art.

Another object of the present invention resides in a cast crankshaft which maximizes the advantages obtainable from casting techniques.

A further object of the present invention resides in a cast crankshaft in which the final product has the lowest possible weight without any sacrifice in rigidity.

A still further object of the present invention resides in a cast crankshaft in which the fatigue limit, especially of the fillets, can reach particularly high values.

Another object of the present invention resides in a cast crankshaft which permits fillets to be rolled into the material while also paying particular attention to core techniques and tolerances of the recesses.

A further object of the present invention resides in a cast crankshaft in which the occurring stresses are at most equal to but preferably lower than in a crankshaft without recesses.

Still another object of the present invention resides in a crankshaft of the type described above, which utilizes the macro-support in the material itself while constituting the ratio of weight to stress gradient as favorable as possible.

A further object of the present invention resides in a cast crankshaft in which burrs occur only at those places where they can be removed without serious damage to the shaft itself.

These and other objects, features and advantages of the present invention will become more apparent from the following description when taken in connection with the accompanying drawing which shows, for purposes of illustration only, two embodiments in accordance with the present invention, and wherein.

Figure 1:
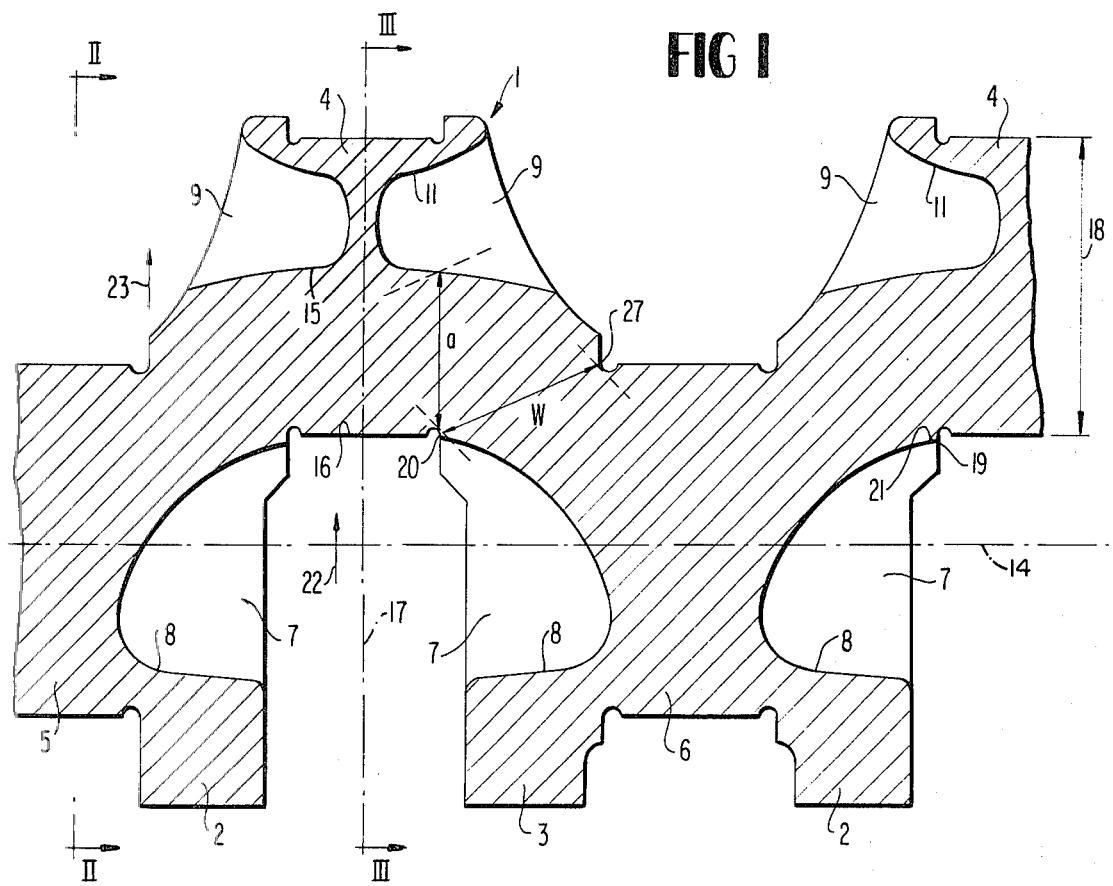
FIG. 1 is a longitudinal cross-sectional view of a part of a crankshaft in accordance with the present invention.
Figure 4:
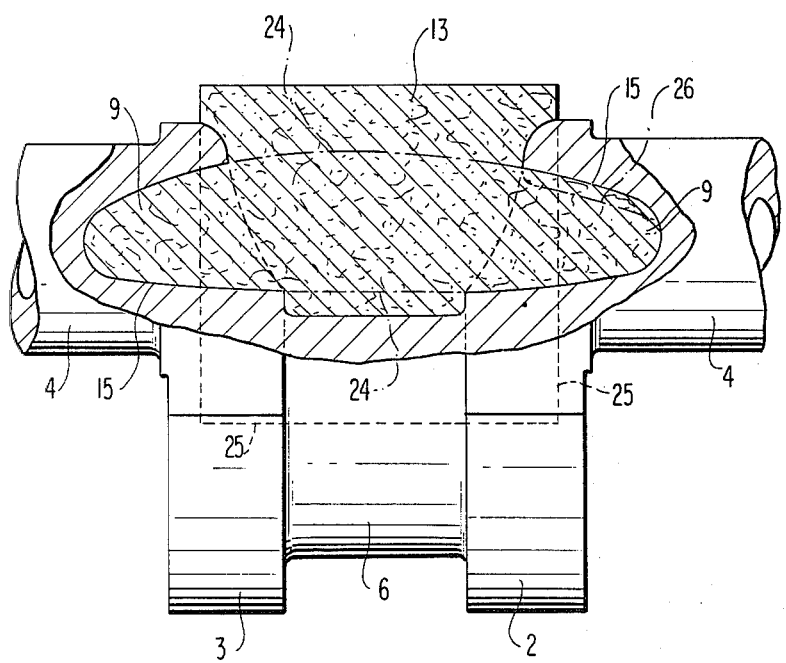
FIG. 4 is a side view of the part of the crankshaft, partly in cross section, with a core inserted within the area between two crank pins.
Figure 5:
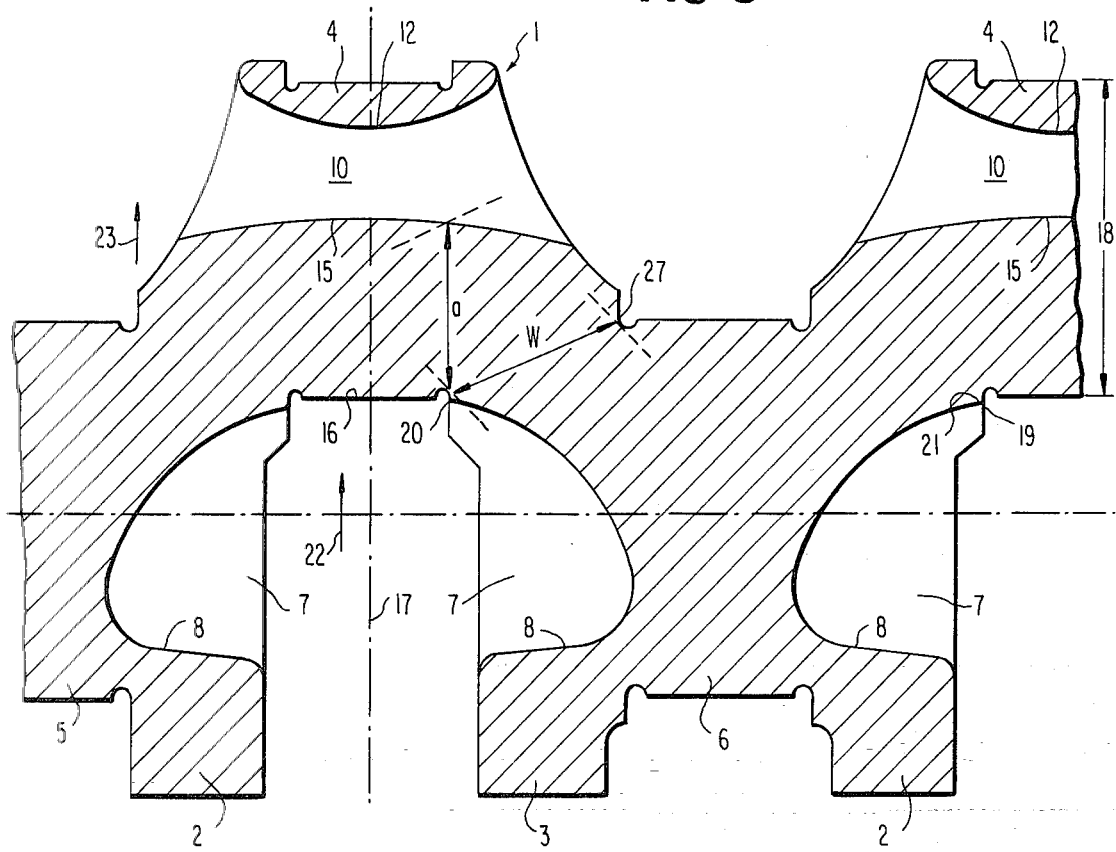
FIG. 5 is a longitudinal cross-sectional view of a part of the crankshaft in accordance with a further embodiment of the present invention.

Referring now to the drawing wherein like reference numerals are used throughout the various views to designate like parts, and, more particularly to FIGS. 1 and 5, according to these figures, the cast crankshaft generally designated by reference numeral 1 which is illustrated in the drawing includes a crank pin 4 between two crank webs 2 and 3 and one main pin 5 and 6 each to the right and left of these crank webs 2 and 3, respectively. The main pin recesses 7 with lines 8 delimiting the same are provided in the main pins 5 and 6. Recesses 9 or apertures 10 (FIG. 5) with wall surfaces or lines 11 or 12 delimiting the same are also provided in the crank pin 4. The delimiting wall surfaces 11 show that two associated crank pin recesses 9 or apertures 10 are provided from each side of a central axis 17 the crank pin 4 and does not extend completely through the crank pin 4. In contradistinction thereto, the crank pin aperture 10 extends uninterruptedly through the crank pin 4 as indicated by the associated boundary surface line 12 in FIG. 5. The type of the crank pin recess 9 or aperture 10, either a continuous aperture 10 or recess 9 or two apertures 10 or recesses 9 from the two sides thereof which are not continuous, is without significance for the rigidity of the crankshaft 1, especially for the fatigue or endurance limit thereof, if only the remaining conditions according to the present invention to be described more fully hereinafter are fulfilled. For the manufacture of the recessess 9 according to the present invention, for example, cores 13 are used, as illustrated in FIG. 4. As a result of the cores 13, recesses 9 result during the casting within the area of the crank pins 4 with inner wall surfaces 11 which each have a boundary line wall surface or line 15 nearest the crankshaft longitudinal center axis 14 and extending approximately parallel thereto. This boundary wall surface or line 15 has a distance a (FIG. 1) with respect to the peripheral line 16 of the crank pin 4, which extends parallel to the longitudinal axis 14 of the crankshaft 1 and is located closest to the axis 14. According to the present invention, the ratio of the smallest distance a of the fillet 20 of the crank pin 4 from the wall surface or line 15 of the recess 9 to the diameter 18 of the crank pin 4 lies between the values of 0.45 and 0.66, especially, at a ratio of 1:2. Additionally, for reasons of rigidity, the spacing a is to be approximately as large as the distance W between adjacent fillets 20 and 27 at the crank pin 4 and at the main pins 5, 6. With such a construction of the recesses, one achieves, a high endurance limit or permanent rigidity and the stresses during loads of the crankshafts 1 are under certain circumstances not even as large as with a crankshaft without recesses. The recesses 7 within the area of the main pin 5 or 6 thereby have as large an extension as possible in a direction toward the crank pin 4 and are to reach at least approximately up to the beginning of the transition of the thrust collar 19 of the fillet 20 at the crank pin 4 or even slightly exceed this limit.

Figure 2:
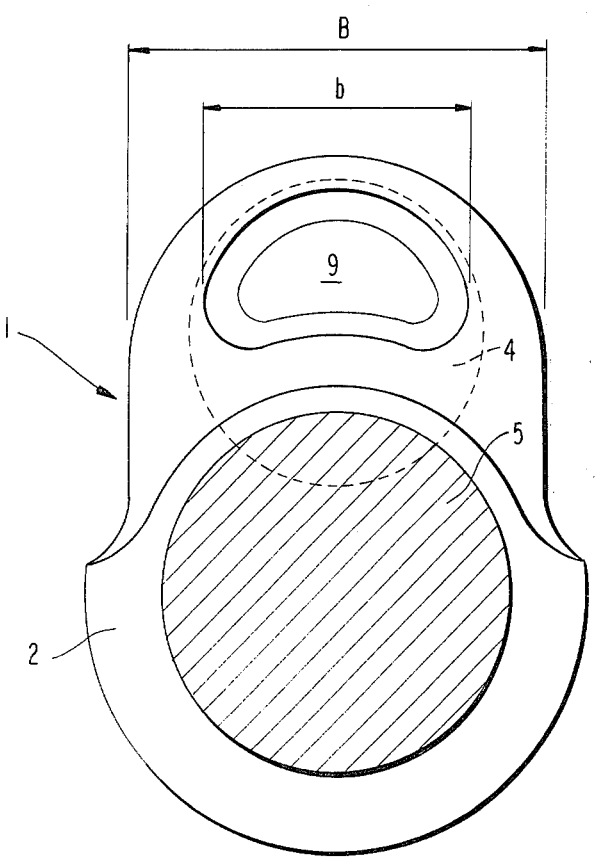
FIG. 2 is a cross-sectional view taken along line II—II of FIG. 1.
Figure 3:
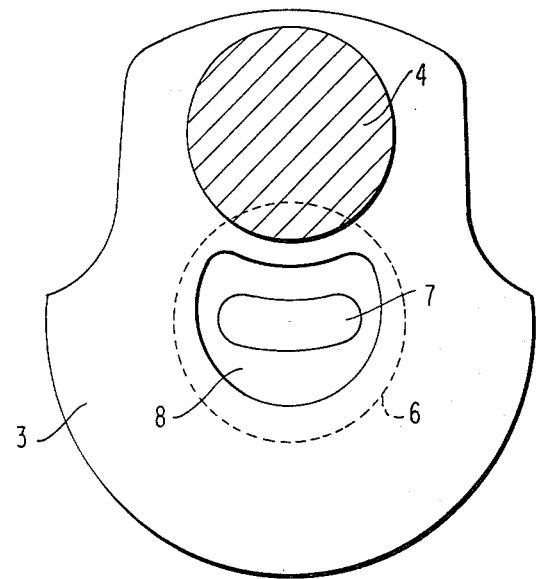
FIG. 3 is a cross-sectional view taken along line III—III of FIG. 1.

As a result of very wide recesses, a very flat stress variation in the circumferential direction of the fillets 27 is achieved; however, this is not very favorable for the rigidity owing to the then absent macro-support effect of the material. Consequently, provision is additionally made according to the present invention that a width b (FIG. 2) of the recesses 9 or apertures 10 to width B of the crank webs 2 or 3 of the crankshaft 1 are at most at a ratio of about 2:3.

Since one has to reckon with a core displacement in the manufacture of the crankshaft 1 with its recesses by cores according to the Croning process, the tolerance specification with respect to the boundary wall surface or line 15 of the inner wall surface 11 of the recess 9 or aperture 10 within an area of the crank pin 4 and with respect to the point 21 (FIG. 1) of the main pin recess 7, which is farthest removed from the center longitudinal axis 14, should be directed only outwardly away from the longitudinal center axis 14 in the direction of the arrows 22 and 23 (FIG. 1).

If the cores are made too small and, for example, had an extension which would be characterized by the projection 24 (FIG. 4) of the approximately eliptically shaped imaginary inner wall surface of the crank pin recesses 9, then the burrs which result about the boundary line of the core especially in the neighborhood of the symmetry plane through a crank web 2 or 3, would have to be removed with greatest care and high expenditure, for damages occur thereat readily in the casting skin within a mechanically highly stressed zone, where an edge with differing and jagged burr formation can frequently result about the core. In order to avoid this, a common core 13 for two mutually oppositely disposed recesses 9 provided in adjacent crank pins 4 is used of such construction and configuration that the boundary surfaces 25 of the core overlap the associated crank webs 2 and 3 beyond their center and in the direction toward the longitudinal center axis 14 extend approximately to the center of the main pin 6.

For increasing the rigidity and for a further reduction of the stresses it is also appropriate if a rib-like recess 26 is provided in the core 13 by means of which a rib-like reinforcement is produced in the recesses 9 during the casting, through which are then placed the oil bores. More particularly, the machined fillets 20 and 27 are hardened by rolling for increasing the permanent strength. This takes place with high pressures and the differing rigidity as a result of the recess has to be taken into consideration in the course of a fillet circumference.

For a completely satisfactory flow of the molten material from a casting point of view through the mold and for avoiding micro-shrinkages or cavities, care must be taken that the cross sections occurring in the model mold are sufficiently large and favorable from a streamlining point of view. The recesses 7, 9 or apertures 10 also must contribute thereto and must have such a construction and arrangement that for the material to be cast, a channel of a flow cross section which is as uniform as possible is assured coming from the main pin 5, between the recesses 7, 9 or apertures 10 in the crank webs 2 and 3 and within the area of the main pin 4. Particular attention has to be paid thereby that the distance a is approximately as large as the distance W between the inner fillets 20 of the crank pin 4 and the outer fillet 27 of the main pin 5 or 6.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A cast crankshaft at least a pair of crank web means, main pin means provided on respective sides of the crank web means, at least one crank pin means provided between the pair of crank web means and cast-in crank pin recess means provided at the crank pin means, the crank pin recess means being formed by core means inserted prior to casting of the crankshaft, characterized in that the crank pin recess means is delimited by a lower boundary surface extending approximately parallel to a longitudinal center axis of the crankshaft, at least one fillet means is provided at the crank pin means at a distance spaced from the boundary surface of the crank pin recess means, at least one further fillet means is provided at each of the main pin means with one of the further fillet means being disposed adjacent the fillet means provided at the crank pin means but spaced therefrom, a ratio of the smallest distance between the fillet means provided at the crank pin means and the lower boundary surface of the crank pin recess means to a diameter of the crank pin means lies between about 0.45 and about 0.66, and in that the smallest distance between the fillet means provided at the crank pin means and the boundary surface of the crank pin recess means is approximately equal to the predetermined distance between the adjacent further fillet means provided at the main pin means and the fillet means provided at the crank pin means.

2. A cast crankshaft according to claim 1, characterized in that said ratio is about 1:2.

3. A cast crankshaft according to claim 1, characterized in that a main pin recess means is provided within an area of each of the main pin means, the at least one fillet means provided at the crank pin includes a thrust collar, the main pin recess means extends in a longitudinal direction at least approximately to a beginning of a transition of the thrust collar of the fillet means provided at the crank pin means.

4. A crankshaft according to claim 3, characterized in that the main pin recess means extends slightly beyond the beginning of the transistion of the thrust collar of the fillet means provided at the crank pin means.

5. A crankshaft according to claim 3, characterized in that a ratio of a width of the crank pin recess means to a width of the crank web means of the crankshaft is about 2:3.

6. A crankshaft according to claim 1, characterized in that a ratio of a width of the crank pin recess means to a width of the crank web means of the crankshaft is about 2:3.

7. A crankshaft according to claim 1, characterized in that at least a pair of crank pin means is provided and separated by one of the main pin means, a crank pin recess means is provided in each of the crank pin means with the respective crank pin recess means opening toward each other, the two crank pin recess means being formed by a common casting core means which includes boundary surfaces which extend over crank web means associated with each of the crank pin means beyond a center of the crank pin means and in a direction toward the longitudinal center axis up to a center of the main pin means.

8. A crankshaft according to claim 1, characterized in that rib-like reinforcements are provided in the crank pin recess means for providing material for accommodating oil bores provided within an area of the crank pin recess means, said rib-like reinforcements following a configuration of the oil bores.

9. A crankshaft according to claim 8, characterized in that the crank pin recess means and the main pin recess means are arranged so as to form a channel for receiving material to be cast, and in that the channel has a relatively uniform flow cross section and extends from the main pin means between the crank pin recess means and within an area of the crank pin means.

10. A crankshaft according to claim 1, characterized in that the crank pin recess means and the main pin recess means are arranged so as to form a channel for receiving material to be cast, and in that the channel has a relatively uniform flow cross section and extends from the main pin means between the crank pin recess means and within an area of the crank pin means.

11. A crankshaft according to one of claims 1, 2, 6, 8, or 10, characterized in that the crank pin recess means extends completely through the crank pin means.

12. A cast crankshaft according to claim 1 characterized in that
first cross-sections are provided along the axis of said crankshaft between the boundary surface of said crank pin recess means nearest said axis and the surface of the crank pin means nearest said axis which are approximately of the same magnitude.

13. A cast crankshaft according to claim 12 characterized in that
main pin recess means is provided by core means inserted prior to casting of the crankshaft, said main pin recess means being delimited by an upper boundary surface extending approximately parallel to a longitudinal center axis of the crankshaft, and
second cross-sections are provided along the axis of said crankshaft between said one and further fillet means which are approximately of the same magnitude as said first cross-sections.

14. A cast crankshaft according to claim 1 characterized in that main pin recess means is provided by core means inserted prior to casting of the crankshaft, said main pin recess means being delimited by an upper boundary surface extending approximately parallel to a longitudinal center axis of the crankshaft, and
cross-sections are provided along the said axis of said crankshaft between said one and further fillet means which are approximately of the same magnitude.

* * * * *